(12) United States Patent
Shi (10) Patent No.: US 11,336,872 B2
(45) Date of Patent: May 17, 2022

(54) LIGHT MODULATING DEVICE FOR DISPLAY APPARATUS, DISPLAY APPARATUS, METHOD OF IMAGE DISPLAY

(71) Applicant: BOE Technology Group Co., Ltd., Beijing (CN)

(72) Inventor: Bingchuan Shi, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 599 days.

(21) Appl. No.: 16/332,901

(22) PCT Filed: Oct. 12, 2018

(86) PCT No.: PCT/CN2018/110057
§ 371 (c)(1),
(2) Date: Mar. 13, 2019

(87) PCT Pub. No.: WO2019/196368
PCT Pub. Date: Oct. 17, 2019

(65) Prior Publication Data
US 2021/0368144 A1    Nov. 25, 2021

(30) Foreign Application Priority Data

Apr. 12, 2018  (CN) ......................... 201810325661.X (51) Int. Cl.
*H04N 9/31*   (2006.01)
*G02B 27/01*  (2006.01)
*G02F 1/1362* (2006.01)

(52) U.S. Cl.
CPC ....... *H04N 9/3152* (2013.01); *G02B 27/0172* (2013.01); *G02F 1/136277* (2013.01)

(58) Field of Classification Search
CPC .. H04N 9/3108; H04N 9/3132; H04N 9/3152; H04N 9/3161; H04N 9/3164;
(Continued)

(56) References Cited

U.S. PATENT DOCUMENTS

2002/0015116 A1   2/2002  Park
2004/0232322 A1   11/2004 Kobayashi et al.
(Continued)

FOREIGN PATENT DOCUMENTS

CN   200979615 Y   11/2007
CN   103718083 A   4/2014
CN   105319712 A   2/2016

OTHER PUBLICATIONS

International Search Report & Written Opinion dated Jan. 17, 2019, regarding PCT/CN2018/110057.
(Continued)

*Primary Examiner* — Sultan Chowdhury
(74) *Attorney, Agent, or Firm* — Intellectual Valley Law, P.C.

(57) ABSTRACT

A light modulating device for a display apparatus includes a light source, and a light modulator including a point illumination source part and a light transmitting part. The point illumination source part is substantially surrounded by the light transmitting part. The point illumination source part is configured to receive polarized light from the light source to form a point illumination source. The point illumination source transmits the polarized light from the light source to a reflective display panel. The light transmitting part is configured to receive light reflected by the reflective display panel and configured to transmit light reflected by the reflective display panel to a light beam collector.

16 Claims, 5 Drawing Sheets

(58) Field of Classification Search
CPC .... H04N 9/3167; G03B 21/008; G03B 21/28; G03B 21/208; G03B 21/567; G02F 1/0136; G02F 1/155; G02F 1/1326; G02F 1/133528; G02F 1/136277; G02B 27/01; G02B 27/017; G02B 27/0101; G02B 27/0172; G02B 27/10; G02B 27/149; G02B 27/283

See application file for complete search history.

(56) References Cited

U.S. PATENT DOCUMENTS

| | | | |
|---|---|---|---|
| 2013/0016292 A1* | 1/2013 | Miao .................... | G02B 27/283 349/11 |
| 2013/0033756 A1 | 2/2013 | Spitzer et al. | |
| 2018/0003964 A1* | 1/2018 | Tatsuno ............... | G03B 21/208 |
| 2018/0039065 A1* | 2/2018 | Iwai ................... | G02B 27/0176 |
| 2019/0086674 A1* | 3/2019 | Sinay .................... | G06T 19/006 |
| 2019/0179149 A1* | 6/2019 | Curtis ................ | G02B 27/0081 |
| 2020/0018964 A1* | 1/2020 | Hillenbrand ......... | G03H 1/0248 |

OTHER PUBLICATIONS

Panasonic G3 Electronic Viewfinder, https://www.imaging-resource.com/PRODS/DMCG3/DMCG3VIEWFINDER.HTM, Aug. 23, 2018.
First Office Action in the Chinese Patent Application No. 201810325661.X, dated Jun. 3, 2019; English translation attached.

* cited by examiner

LIGHT MODULATING DEVICE FOR DISPLAY APPARATUS, DISPLAY APPARATUS, METHOD OF IMAGE DISPLAY

CROSS-REFERENCE TO RELATED APPLICATION

This application is a national stage application under 35 U.S.C. § 371 of International Application No. PCT/CN2018/110057, filed Oct. 12, 2018, which claims priority to Chinese Patent Application No. 201810325661.X, filed Apr. 12, 2018, the contents of which are incorporated by reference in the entirety.

TECHNICAL FIELD

The present invention relates to display technology, more particularly, to a light modulating device for a display apparatus, a display apparatus, and a method of image display.

BACKGROUND

Liquid Crystal on Silicon (LCOS) is a type of reflective liquid crystal display. Typically, the LCOS display uses integrated circuit chip made of a complementary metal oxide semiconductor coated with liquid crystal silicon, e.g., a complementary metal oxide semiconductor (referred to as CMOS) as a substrate of a reflective liquid crystal display panel. The surface is polished and plated with aluminum as a mirror to form a CMOS substrate. The CMOS substrate and a counter substrate having transparent electrodes are assembled together into a cell, and liquid crystal molecules are injected into the cell to form the LCOS display panel.

SUMMARY

In one aspect, the present invention provides a light modulating device for a display apparatus, comprising a light source; and a light modulator comprising a point illumination source part and a light transmitting part, the point illumination source part being substantially surrounded by the light transmitting part; wherein the point illumination source part is configured to receive polarized light from the light source to form a point illumination source, the point illumination source transmitting the polarized light from the light source to a reflective display panel; and the light transmitting part is configured to receive light reflected by the reflective display panel and configured to transmit light reflected by the reflective display panel to a light beam collector.

Optionally, the light modulating device further comprises a light guide configured to transmit the light emitted from the light source to the point illumination source part, thereby forming the point illumination source in the point illumination source part.

Optionally, the point illumination source part is configured to allow light transmitted by the light guide to transmit through the point illumination source part, thereby forming the point illumination source for providing light to the reflective display panel; and the light transmitting part is configured to receive light reflected by the reflective display panel and configured to reflect the light reflected by the reflective display panel to the light beam collector.

Optionally, the light guide comprises an optical fiber configured to transmit the light emitted from the light source to the point illumination source part; and the point illumination source part is configured to allow light transmitted by the optical fiber to transmit through the point illumination source part, thereby forming the point illumination source for providing the light to the reflective display panel.

Optionally, the light modulator comprises a via extending at least partially through the point illumination source part; and a first terminal of the optical fiber is secured in the via.

Optionally, the light modulating device further comprises an optical fiber securer attached to a surface of the light modulator; wherein a first terminal of the optical fiber is in a via extending at least partially through the optical fiber securer.

Optionally, the via has a diameter equal to or less than 150 µm.

Optionally, the light transmitting part comprises one or a combinations of a reflective layer and a plurality of reflective prisms, configured to reflect the light reflected by the reflective display panel to the light beam collector.

Optionally, the point illumination source part is configured to reflect light transmitted by the light guide to the reflective display panel, thereby forming the point illumination source for providing light to the reflective display panel; and the light transmitting part is configured to receive light reflected by the reflective display panel and configured to allow the light reflected by the reflective display panel to transmit through the light transmitting part to the light beam collector.

Optionally, the light guide comprises am optical coupling lens configured to focus the light emitted from the light source onto the point illumination source part; and the point illumination source part is configured to reflect light focused by the optical coupling lens, thereby forming the point illumination source for providing the light to the reflective display panel.

Optionally, the point illumination source part comprises one or a combinations of a reflective layer and a plurality of reflective prisms, configured to reflect the light transmitted by the light guide.

Optionally, the light modulator has a light separating surface, from which the light transmitting part transmits the light reflected by the reflective display panel to the light beam collector and from which the point illumination source part transmits the polarized light from the light source to the reflective display panel; and the light separating surface and a main surface of the reflective display panel form an angle less than 90 degrees.

Optionally, the light modular is spaced apart from the reflective display panel; and the light separating surface is a surface of the light modulator facing the reflective display panel.

Optionally, the light modular is adhered to the reflective display panel; and the light separating surface is a surface of the light modulator facing away the reflective display panel.

Optionally, the point illumination source is configured to transmit the polarized light from the light source to form an illumination zone to illuminate the reflective display panel; and a central axis of the illumination zone approximately intersects with a central point of the reflective display panel.

In another aspect, the present invention provides a display apparatus, comprising the light modulating device described herein or fabricated by a method described herein; and the reflective display panel configured to receive light transmitted from the point illumination source, and configured to reflect light to the light transmitting part.

Optionally, the reflective display panel is a liquid crystal on silicon display panel.

Optionally, the display apparatus is a near eye display apparatus.

In another aspect, the present invention provides a method of image display, comprising footling a point illumination source in a point illumination source part of a light modulator, the point illumination source configured to provide point illumination; transmitting light from the point illumination source to a reflective display panel; reflecting light from the point illumination source by the reflective display panel to a light transmitting part of the light modulator, the point illumination source part being substantially surrounded by the light transmitting part; and transmitting light reflected by the reflective display panel to a light beam collector by the light transmitting part.

Optionally, the method further comprises providing polarized light from a light source; and transmitting polarized light from the light source to the point illumination source part to form the point illumination source.

BRIEF DESCRIPTION OF THE. FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Conventional LCOS display apparatuses are made bulky, and only a relatively low light utilization rate in the conventional LCOS display apparatus can be achieved. The present disclosure provides, inter alit, a light modulating device for a display apparatus, a display apparatus, and a method of image display that substantially obviate one or more of the problems due to limitations and disadvantages of the related art. M one aspect, the present disclosure provides a light modulating device for a display apparatus.

In some embodiments, the light modulating device for a display apparatus includes a light source, and a light modulator including a point illumination source part and a light transmitting part. The point illumination source part is substantially surrounded by the light transmitting part. Optionally, the point illumination source part is configured to receive polarized light from the light source to form a point illumination source, and the point illumination source transmits the polarized light from the light source to a reflective display panel. Optionally, the light transmitting part is configured to receive light reflected by the reflective display panel and configured to transmit light reflected by the reflective display panel to a light beam collector. A display apparatus having the present light modulating device can be made to have a highly compact structure, and a relatively high light utilization rate can be achieved in the display apparatus.

As used herein the term "substantially surrounded" refers to at least 50% (e.g., at least 60%, at least 70%, at least 80%, at least 90%, at least 95%, at least 99%, and 100%) of a perimeter of an area being surrounded.

As used herein, the term "point illumination source" refers to illumination sources having small dimensions relative to an optical system the point illumination source is in, for example, relative to the reflective display panel. For example, when the reflective display panel is relatively large, even a relatively larger illumination source can be regarded as a substantial point illumination source. When the reflective display panel is relatively small, the point illumination source should have a relatively small size in order to function as a point illumination source substantially. The term point illumination source is not necessarily meant to be an accurate point. The term "point" means that it is a point when seen in a macro view, and the illumination source may not have a point shape when viewed in a micro view. Illumination sources may be "direct" illumination sources (e.g., sources providing light transmitted through a light guide or optical fiber) or "indirect" illumination sources (e.g., sources which do not actually source light but reflect light). Point illumination sources refer to emitting or reflecting portion of the illumination sources. Optionally, the point illumination source has a maximum size of approximately 3 mm, e.g., 2 min, 1 mm, 500 μm, 250 μm, 150 μm, 100 μm, 50 μm, 25 μm, and 10 μm. Optionally, the point illumination source is configured to provide a diffuse light having an illumination zone, e.g., of a cone shape.

Optionally, the light beam collector is an eye of an observer. Optionally, the light beam collector is a screen.

In the present light modulating device, the light modulator has a light separating surface from which the light transmitting part transmits the light reflected by the reflective display panel to the light beam collector and from which the point illumination source part provides the light to the reflective display panel. Optionally, the point illumination source part transmits the light from the light source to the reflective display panel. Optionally, the point illumination source part reflects the light from the light source to the reflective display panel. The point illumination source part occupies a relatively small area on the light separating surface, as compared to the light transmitting part. The point illumination source part can only block a minimal amount of light directed toward the light separating surface. Substantially an entirety of the light separating surface (except for the part occupied by the point illumination source part) is configured to transmit light to the light beam collector. The missing optical information corresponding to the point illumination source part is minimal. Essentially all light directed toward the light transmitting part can be received by the light beam collector, resulting in a very high light utilization rate.

In some embodiments, a size of the reflective display panel is correlated to a size of the light transmitting part. For example, a larger reflective display panel requires that the size of the light transmitting part to be correspondingly larger.

Figure 1:
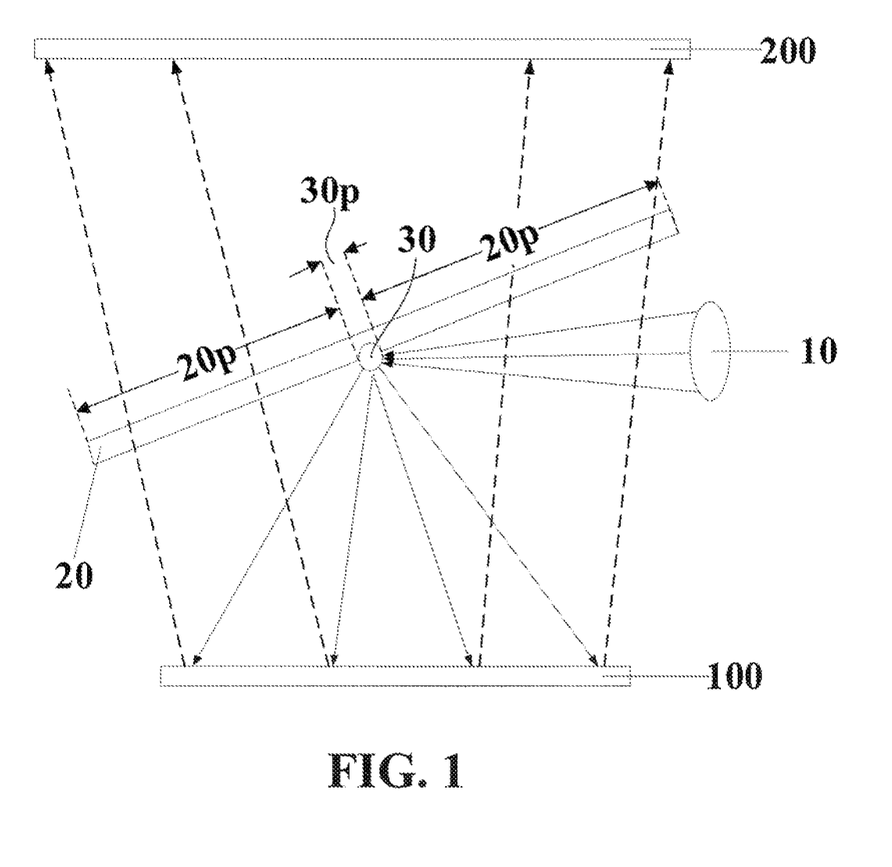
FIG. 1 is a schematic diagram illustrating the structure of a display apparatus having a light modulating device in some embodiments according to the present disclosure.

FIG. 1 is a schematic diagram illustrating a display apparatus having a light modulating device in some embodiments according to the present disclosure. Referring to FIG. 1, the light modulating device in some embodiments includes a light source 10 and a light modulator 20. The display apparatus include the light modulator and a reflective display panel 100. The light modulator 20 is disposed between the reflective display panel 100 and a light beam collector 200. As shown in FIG. 1, the light modulator 20 in some embodiments includes a point illumination source part 30p and a light transmitting part 20p, the point illumination source part 30p being substantially surrounded by the light transmitting part 20p. The point illumination source part 30p is configured to receive light from the light source 10 to form a point illumination source 30, the point illumination source 30 transmitting the light from the light source 10 to the reflective display panel 100. In one example, the light source 10 is located between a plane of the light modulator 20 and a plane of the reflective display panel 100, an orthographic projection of the light source 10 on the reflective display panel 100 is outside an orthographic projection of the light modulator 20 on the reflective display panel 100. The light transmitting part 20p is configured to receive light reflected by the reflective display panel 100 and configured to transmit light reflected by the reflective display panel 100 to a light beam collector 200. When the light source 10 is turned on, the light reflected by the reflective display panel 100 and received by the light transmitting part 20p of the light modulator 20 substantially surrounds the point illumination source 30. The present light modulating device can be made into a highly compact structure. A relatively high energy utilization rate can be achieved in the display apparatus having the present light modulating device.

Examples of the reflective display panel 100 includes a liquid crystal on silicon display panel, a digital micro mirror display panel, a micro electro mechanical display panel, and an electrophoretic display panel.

Figure 2:
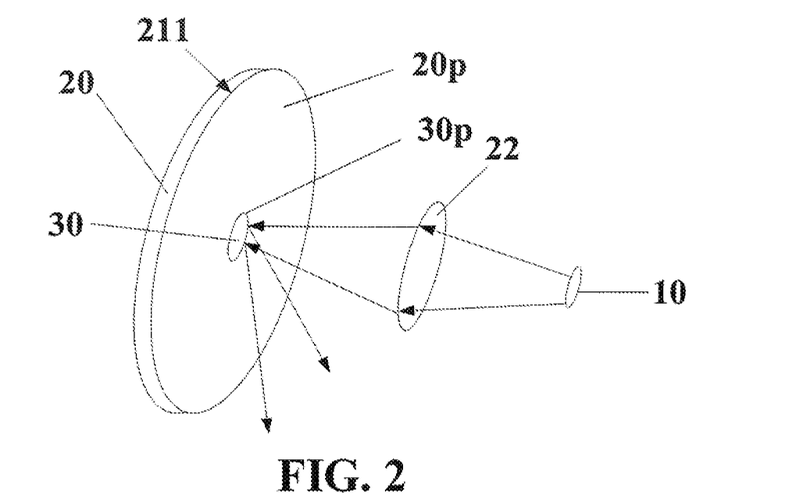
FIG. 2 is a schematic diagram illustrating the structure off light modulating device in some embodiments according to the present disclosure.

FIG. 2 is a schematic diagram illustrating the structure of a light modulating device in some embodiments according to the present disclosure. Referring to FIG. 2, the light modulating device in some embodiments includes a light modulator 20, a light source 10, and further include a light guide 22, The light modulator 20 in some embodiments includes a point illumination source part 30p and a light transmitting part 20p, as discussed above. The light guide 22 is configured to transmit the light emitted from the light source 10 to the point illumination source part 30p, thereby forming the point illumination source 30 in the point illumination source part 30p. The light transmitting part 20p is configured to receive light reflected by the reflective display panel 100 and configured to transmit light reflected by the reflective display panel 100 to the light beam collector 200. The point illumination source part 30p being substantially surrounded by the light transmitting part 20p. As shown in FIG. 2, in some embodiments, the light modulator 20 has a light separating surface 211 from which the light transmitting part 20p transmits the light reflected by the reflective display panel 100 to the light beam collector 200 and from which the point illumination source part 30p reflects the light from the light source 10 to the reflective display panel 100, The light transmitting part 20p transmits the light reflected by the reflective display panel 100 through the light separating surface 211 then to the light beam collector. The point illumination source part 30p transmits the light from the light source 10 from the light separating surface 211 to the reflective display panel 100. Optionally, the light separating surface 211 has a first region corresponding to the light transmitting part 20p and a second region corresponding to the point illumination source part 30p.

Figure 3:
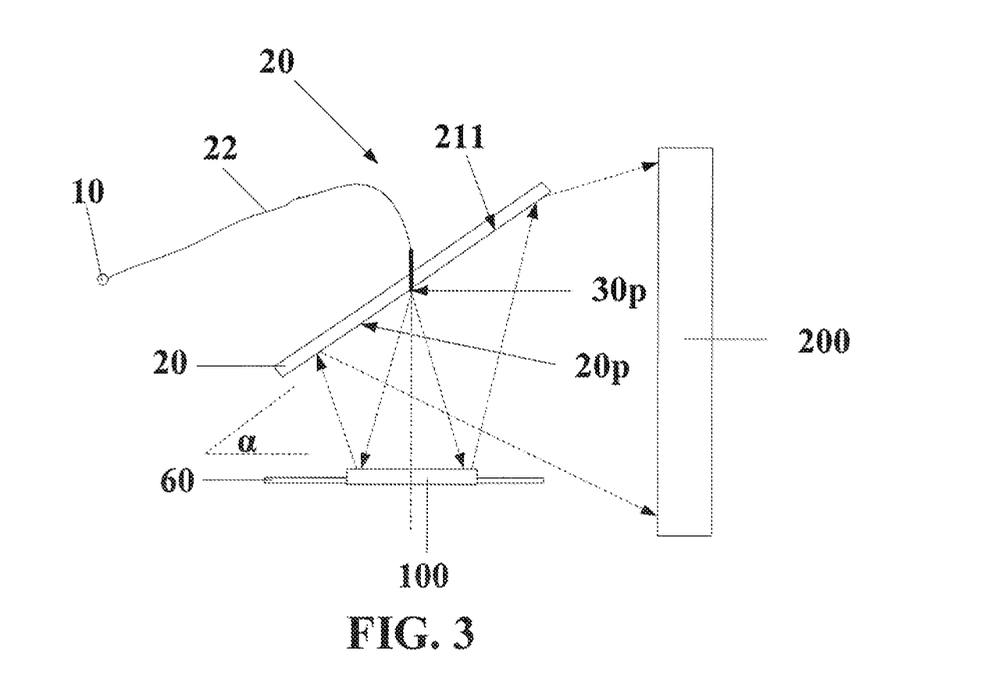
FIG. 3 is a schematic diagram illustrating the structure of a display apparatus having a light modulating device in some embodiments according to the present disclosure.
Figure 4:
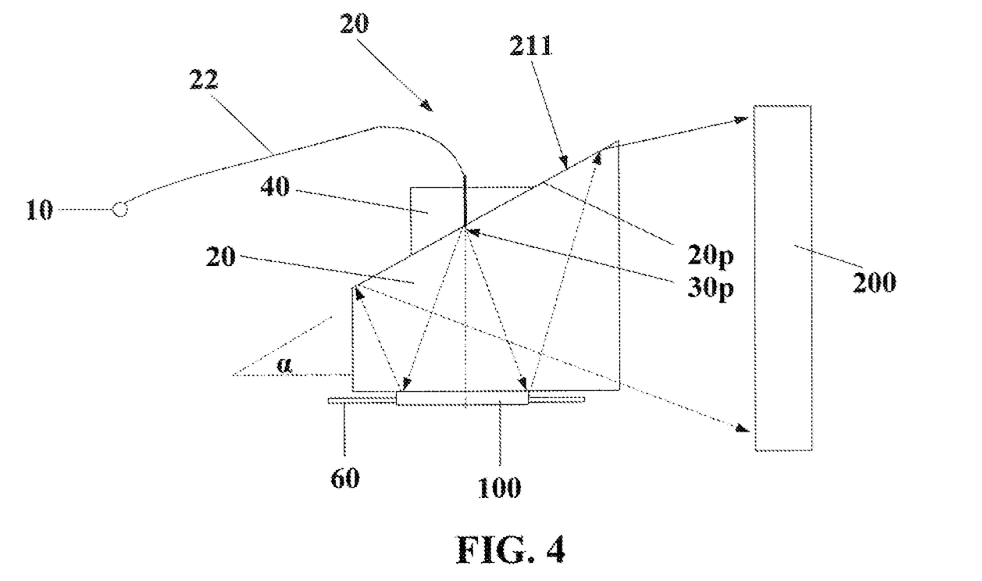
FIG. 4 is a schematic diagram illustrating the structure of a display apparatus having a light modulating device in some embodiments according to the present disclosure.

FIG. 3 is a schematic diagram illustrating the structure of a display apparatus having a light modulating device in some embodiments according to the present disclosure. FIG. 4 is a schematic diagram illustrating the structure of a display apparatus having a light modulating device in some embodiments according to the present disclosure. Referring to FIG. 3 and FIG. 4, in some embodiments, the point illumination source part 30p is configured to allow light transmitted by the light guide 22 to transmit through the point illumination source part 30p, thereby forming the point illumination source 30 for providing light to the reflective display panel 100. The light transmitting part 20p is configured to receive light reflected by the reflective display panel 100 and configured to reflect the light reflected by the reflective display panel 100 to the light beam collector 200. The light transmitting part 20p reflects the light reflected by the reflective display panel 100 from the light separating surface 211 to the light beam collector 200, i.e., the light separating surface 211 is a reflective surface with respect to transmission of light reflected by the reflective display panel 100 to the light beam collector 200. The point illumination source part 30p emits the light from the light source 10 from the light separating surface 211 to the reflective display panel 100, i.e., the light separating surface 211 is a light emitting surface with respect to transmission of light from the light source 10 to the reflective display panel 100. Optionally, the light separating surface 211 has a light reflective region corresponding to the light transmitting part 20p and a light emitting region corresponding to the point illumination source part 30p. In FIG. 3 and FIG. 4, the point illumination source 30 is formed as an emitting source.

Referring to FIG. 3 and FIG. 4, the light guide 22 in some embodiments includes an optical fiber optically coupled to the light source 10, and configured to transmit the light emitted from the light source 10 to the point illumination source part 30p. The point illumination source part 30p is configured to allow light transmitted by the optical fiber to transmit through the point illumination source part 30p, thereby forming the point source 30 for providing the light to the reflective display panel 100.

Figure 5:
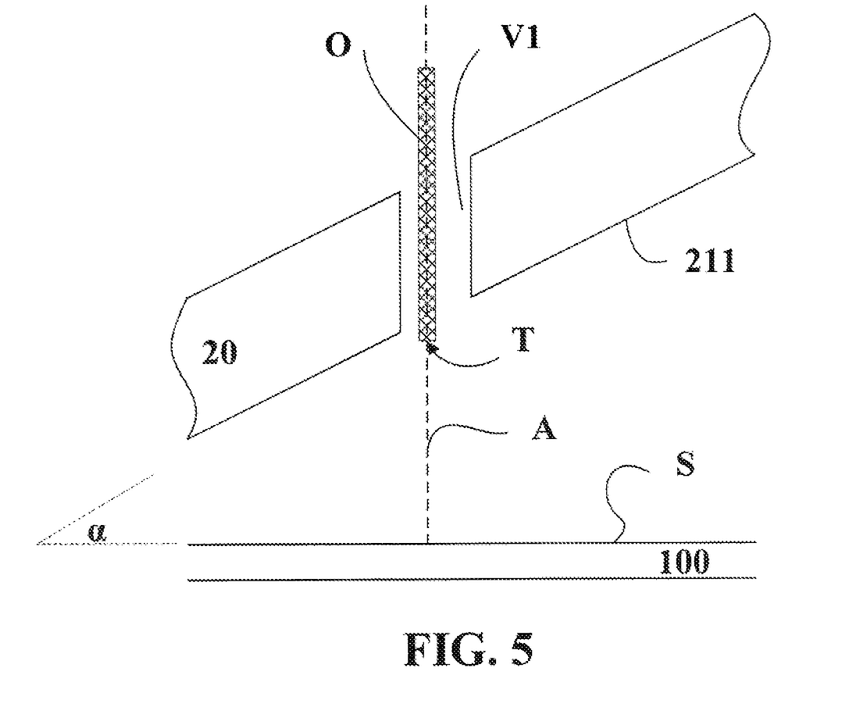
FIG. 5 is a schematic diagram illustrating a via extending through a light separating surface of a light modulator in some embodiments according to the present disclosure.

Referring to FIG. 3, in some embodiments, the light modulator 20 is spaced apart from the reflective display panel 100. The light separating surface 211 is a surface of the light modulator 20 facing, the reflective, display panel 100. In some embodiments, the light separating surface 211 in a region corresponding to the light transmitting part 20p is a highly reflective surface configured to reflect the light reflected by the reflective display panel 100 to the light beam collector 200, FIG. 5 is a schematic diagram illustrating a via extending through a light separating surface of a light modulator in some embodiments according to the present disclosure. Referring to FIG. 3 and FIG. 5, the light modulator 20 in some embodiments includes a first via V1 extending at least partially through the point illumination source part 30p. A first terminal T of the optical fiber O is secured in the first via V1, thereby forming the point illumination source 30.

The light transmitting part 20p substantially surrounds the first via V1. Optionally, the first via V1 extends through the light separating surface 211 in the region corresponding to the point illumination source part 30p, the first terminal T of the optical fiber O is configured to transmit the light emitted from the light source 10 to a position corresponding to the first via V1, thereby forming the point illumination source 30 at the light separating surface 211. In one example, the point illumination source part 30p is a part of the light modulator 20 corresponding to the first via V1.

Optionally, the highly reflective surface of the light separating surface 211 is formed by a highly reflective metal material such as aluminum and silver.

In some embodiments, the first via V1 extending through the light separating surface 211 has a relatively small size. Optionally, the first via V1 has a size that only allows a single optical fiber to extend through, e.g., having a diameter in a range of 1.0 to 1.5 times of a diameter of a single optical fiber. Optionally, the first via V1 has a diameter equal to or less than 150 μm. Optionally, a central axis A of the first via V1 is substantially perpendicular to a main surface S of the reflective display panel 100. Optionally, the optical fiber O in the first via V1 extends along a direction substantially perpendicular to the main surface S of the reflective display panel 100. Optionally, a projection of the first terminal T of the optical fiber on the reflective display panel 100 substantially overlaps with a central point of the reflective display panel 100. By having this design, the reflective display panel 100 is configured to receive the light from the point illumination source 30 in a symmetrical manner. As used herein, the term "substantially perpendicular" means that an angle between two directions is in the range of approximately 45 degrees to approximately 135 degrees, e.g., approximately 90 degrees, approximately 85 degrees to approximately 95 degrees, approximately 80 degrees to approximately 100 degrees, approximately 75 degrees to approximately 105 degrees, approximately 70 degrees to approximately 110 degrees, approximately 65 degrees to approximately 115 degrees, approximately 60 degrees to approximately 120 degrees.

Optionally, the first terminal T of the optical fiber is inside the first via V1. Optionally, the first terminal T of the optical fiber protrudes out of the first via V1 by a short distance, e.g., by a distance less than 100 μm.

In some embodiments, and referring to FIG. 3 and FIG. 5, light emitted from the light source 10 is coupled into the optical fiber, the optical fiber transmits the light to the point illumination source part 30p of the light modulator 20, the first terminal T of the optical fiber O outputs a diffused light and the diffused light illuminates on the reflective display panel 100. Optionally, the light from the point illumination source part 30p is a polarized light, a polarization direction of which is substantially parallel to a polarization direction of the reflective display panel 100. As used herein, the term "substantially parallel" means that an angle between two directions is in the range of 0 degree to approximately 45 degrees, e.g., 0 degree to approximately 5 degrees, 0 degree to approximately 0.10 degrees, 0 degree to approximately 15 degrees, 0 degree to approximately 20 degrees, 0 degree to approximately 25 degrees, 0 degree to approximately 30 degrees, and optionally approximately 0 degree.

Referring to Fla 3 and FIG. 5, the light separating surface 211 and the main surface S of the reflective display panel 100 form an angle α. Optionally, the angle α is less than 90 degrees. Optionally, a line perpendicular to the main surface S of the reflective display panel 100 and intersecting a central point of the reflective display panel 100 intersects the light separating surface 211 at a central point of the point illumination source part 30p. Optionally, an orthographic projection of the central point of the point illumination source part 30p on the reflective display panel 100 intersects the central point of the reflective display panel 100. The light from the first terminal T of the optical fiber O is a diffused light transmitted to the reflective display panel 100. By adjusting a distance between the light separating surface 211 and the reflective display panel 100 and the angle α between the light separating surface 211 and the main surface S of the reflective display panel 100, it can be ensured that light from the first terminal T of the optical fiber O illuminates on a substantially entire surface of the reflective display panel 100. For example, the light from the first terminal T of the optical fiber O forms an illumination zone illuminating the surface of the reflective display panel 100. The light from the illumination zone is reflected by the reflective display panel 100, in a form of another illumination zone having a greater area. The light reflected by the reflective display panel 100 reaches the light separating surface 211 in a region corresponding to the light transmitting part 20p of the light modulator 20. The light transmitting part 20p reflects the light to the light beam collector 200.

Referring to FIG. 3 and FIG. 4, the light beam collector 200 in some embodiments is disposed on a lateral side of the reflective display panel 100 and the light modulator 20 at a position for receiving light reflected by the light modulator 20.

The point illumination source part 30p has a relatively very small area as compared to an area of the light transmitting part 20p. Essentially all light reflected by the light transmitting part 20p of the light modulator 20 can be received by the light beam collector 200, resulting in a very high light utilization rate.

Referring to FIG. 4, the light modulator 20 in some embodiments is adhered to the reflective display panel 100 (e.g., to a main surface of the reflective display panel 100). The light separating surface 211 is a surface of the light modulator 20 facing away the reflective display panel 100. In some embodiments, the light modulating device further includes an optical fiber securer 40 attached to a surface of the light modulator 20, e.g., attached to the light separating surface 211 of the light modulator 20. The optical fiber securer 40 is configured to secure an optical fiber.

Figure 6:
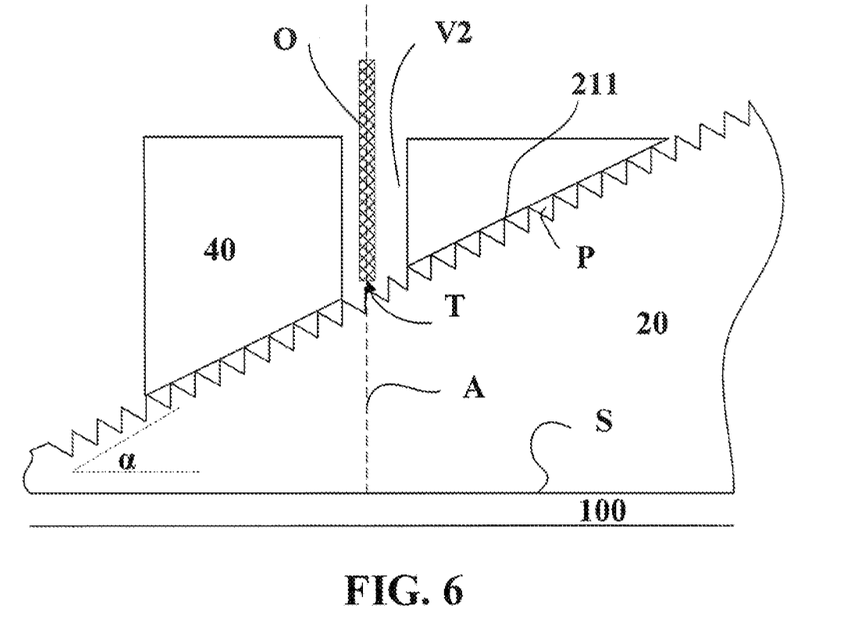
FIG. 6 is a schematic diagram illustrating a via extending through an optical fiber securer in some embodiments according to the present disclosure.

FIG. 6 is a schematic diagram illustrating a via extending through an optical fiber securer in some embodiments according to the present disclosure. Referring to FIG. 6, the light modulating device in some embodiments includes a second via V2 extending at least partially through the optical fiber securer 40. A first terminal T of the optical fiber O is secured in the second via V2, thereby forming the point illumination source 30. The light transmitting part 20p substantially surrounds the second via V2. Optionally, the second via V2 exposes a portion the light separating surface 211 in the region corresponding to the point illumination source part 30p, a first terminal T of the optical fiber O is configured to transmit the light emitted from the light source 10 to a position corresponding to the second via V2, thereby forming the point illumination source 30 at the light separating surface 211. In one example, the point illumination source part 30p is a part of the light modulator 20 corresponding to the second via V2. The light emitted from the first terminal T of the optical fiber O is transmitted through the inside of the light modulator 20 to the reflective display panel 100, which is adhered to the light modulator 20.

Optionally, the highly reflective surface of the light separating surface 211 includes a plurality of reflective prisms P surrounding the point illumination source part 30p. The light reflected by the reflective display panel 100 is transmitted through the inside of the light modulator 20 to the plurality of reflective prisms P. The plurality of reflective prisms P are configured to reflect the light reflected by the reflective display panel 100 to the light beam collector 200.

In some embodiments, the second via V2 has a relatively small size. Optionally, the second via V2 has a size that only allows a single optical fiber to extend through, e.g., having a diameter in a range of 1.0 to 1.5 times of a diameter of a single optical fiber. Optionally, the second via. V2 has a diameter equal to or less than 150 μm. Optionally, a central axis A of the second via V2 is substantially perpendicular to a main surface S of the reflective display panel 100. Optionally, the optical fiber O in the second via V2 extends along a direction substantially perpendicular to the main surface S of the reflective display panel 100. Optionally, a projection of the first terminal T of the optical fiber O on the reflective display panel 100 substantially overlaps with a central point of the reflective display panel 100. By having this design, the reflective display panel 100 is configured to receive the light from the point illumination source 30 in a symmetrical manner.

Optionally, the first terminal T of the optical fiber O is inside the second via V2. Optionally, the first terminal. T of the optical fiber O protrudes out of the second via V2 by a short distance, e.g., by a distance less than 100 μm. Optionally, the point illumination source part 30p of the light modulator 20 has a recess in a position corresponding to the first terminal T of the optical fiber O, and configured to receive the first terminal T protruding out of the second via V2.

In some embodiments, and referring to FIG. 4 and FIG. 6, light emitted from the light source 10 is coupled into the optical fiber O, the optical fiber O secured by the optical fiber securer 40 transmits the light to the point illumination source part 30p of the light modulator 20, the first terminal T of the optical fiber O outputs a diffused light and the diffused light illuminates on the reflective display panel 100. The light from the point illumination source part 30p transmits through the inside of the light modulator 20. Optionally, the light from the point illumination source part 30p is a polarized light, a polarization direction of which is substantially parallel to a polarization direction of the reflective display panel 100.

Referring to Fla 4 and FIG. 6, the light separating surface 211 and the main surface S of the reflective display panel 100 form an angle α. Optionally, the angle α is less than 90 degrees. Optionally, a central normal line of the reflective display panel 100 intersects the light separating surface 211 at a central point of the point illumination source part 30p. The light from the first terminal T of the optical fiber O is a diffused light transmitted to the reflective display panel 100. The light modulator 20 can be designed to have dimension to ensure that light from the first terminal T of the optical fiber O illuminates on a substantially entire surface of the reflective display panel 100. For example, the light modulator 20 can be designed to result in a distance between the light separating surface 211 and the reflective display panel 100 and the angle α between the light separating surface 211 and the main surface S of the reflective display panel 100, such that the light from the first terminal T of the optical fiber O illuminates on a substantially entire surface of the reflective display panel 100. In one example, the light from the first terminal T of the optical fiber O forms an illumination zone illuminating the surface of the reflective display panel 100. The light from the illumination zone is reflected by the reflective display panel 100, in a form of another illumination zone having a greater area. The light reflected by the reflective display panel 100 reaches the light separating surface 211 in a region corresponding to the light transmitting part 20p of the light modulator 20. The light transmitting part 20p reflects the light to the light beam collector 200.

Referring to FIG. 3 and FIG. 4, the light beam collector 200 in some embodiments is disposed on a lateral side of the reflective display panel 100 and the light modulator 20 at a position for receiving light reflected by the light modulator 20.

The point illumination source part 30p has a relatively very small area as compared to an area of the light transmitting part 20p. Essentially all light reflected by the light transmitting part 20p of the light modulator 20 can be received by the light beam collector 200, resulting in a very high light utilization rate.

In FIG. 4, the reflective display panel 100 is adhered to the light modulator 20, resulting in a simplified and highly compact structure.

Figure 7:
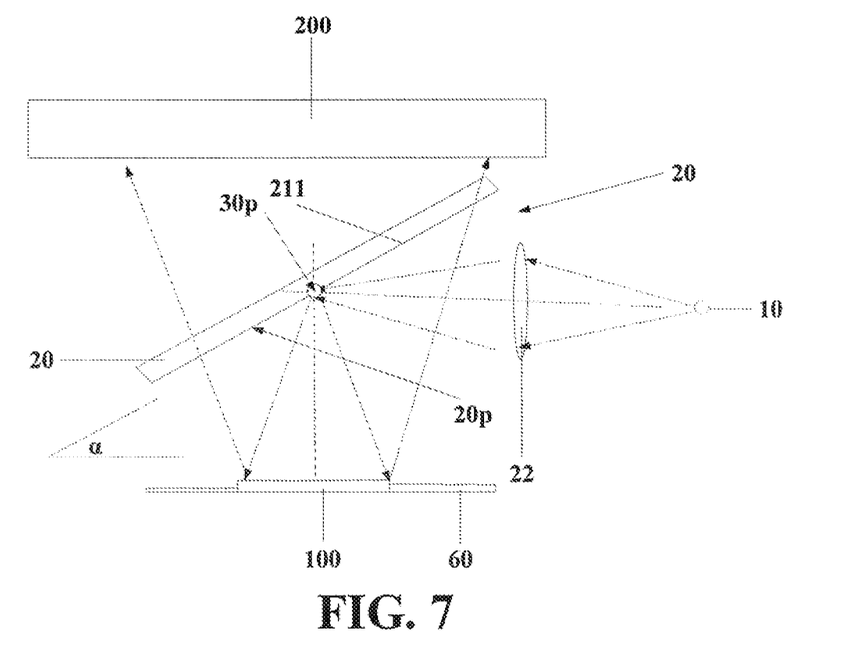
FIG. 7 is a schematic diagram illustrating the structure of a display apparatus having a light modulating device in some embodiments according to the present disclosure.
Figure 8:
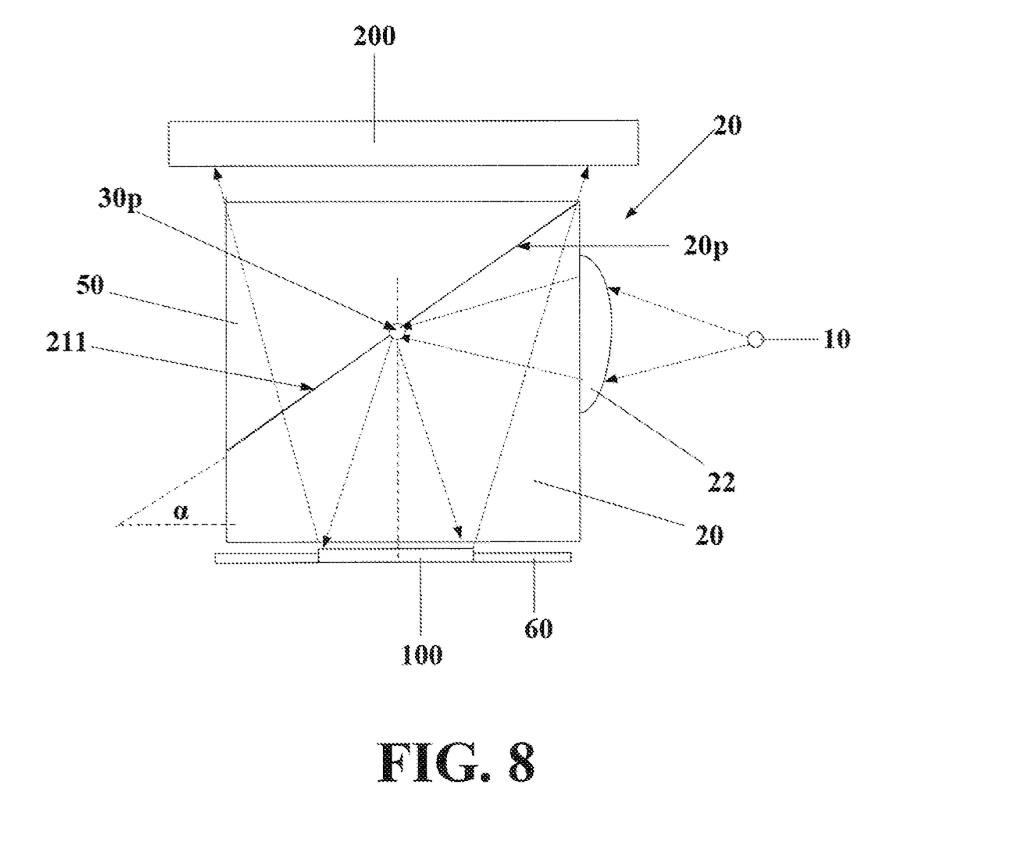
FIG. 8 is a schematic diagram illustrating the structure of a display apparatus having a light modulating device in some embodiments according to the present disclosure.

FIG. 7 is a schematic diagram illustrating the structure of a display apparatus having a tight modulating device in some embodiments according to the present disclosure. FIG. 8 is a schematic diagram illustrating the structure of a display apparatus having a light modulating device in some embodiments according to the present disclosure. Referring to FIG. 7 and FIG. 8, in some embodiments, the point illumination source part 30p is configured to reflect light transmitted by the light guide 22 to the reflective display panel 100, thereby forming the point illumination source 30 for providing light to the reflective display panel 100. The light transmitting part 20p is configured to receive light reflected by the reflective display panel 100 and configured to allow the light reflected by the reflective display panel 100 to transmit through the light transmitting part 20p to the light beam collector 200. The point illumination source part 30p reflects the light from the light source 10 on the light separating surface 211 and to the reflective display panel 100, i.e., the light separating surface 211 is a reflective surface with respect to transmission of light from the light source 10 to the reflective display panel 100. The light transmitting part 20p allows the light reflected by the reflective display panel 100 to transmit from the light separating surface 211 to the light beam collector 200, i.e., the light separating surface 211 is a transmissive surface with respect to transmission of light reflected by the reflective display panel 100 to the light beam collector 200. Optionally, the light separating surface 211 has a light reflective region corresponding to the point illumination source part 30p and a light transmissive region corresponding to the light transmitting part 20p. In FIG. 7 and FIG. 8, the point illumination source 30 is formed as an indirect illumination source (e.g., by reflection).

Referring to FIG. 7 and FIG. 8, the light guide 22 in some embodiments includes an optical coupling lens configured to focus the light emitted from the light source 10 onto the point illumination source part 30p. The point illumination source part 30p is configured to reflect light focused by the optical coupling lens, thereby forming the point illumination source 30 for providing the light to the reflective display panel 100.

Referring to FIG. 7, in some embodiments, the light modulator 20 is spaced apart from the reflective display panel 100. The light separating surface 211 is a surface of the light modulator 20 facing the reflective display panel 100. In some embodiments, the light separating surface 211 in a region corresponding to the point illumination source part 30p is a highly reflective surface configured to reflect the light reflected by the light source 10 to the reflective display panel 100. Optionally, the highly reflective surface of the light separating surface 211 is formed by a highly reflective metal material such as aluminum and silver.

Optionally, the point illumination source part 30p has a relatively small area, Optionally, the point illumination source part 30p has a diameter or width equal to or less than 50 µm, e.g., equal to or less than 40 µm, equal to or less than 30 µm, equal to or less than 20 µm, and equal to or less than 10 µm.

Optionally, a central point of a projection of the point illumination source part 30p on the reflective display panel 100 substantially overlaps with a central point of the reflective display panel 100. By having this design, the reflective display panel 100 is configured to receive the light from the point illumination source 30 in a symmetrical manner. Optionally, an optical axis of the optical coupling lens and a central normal line of the reflective display panel 100 are symmetrical with respect to a line normal to the light separating surface 211 and intersecting a central point of the point illumination source part 30p.

In some embodiments, the light transmitting part 20p of the light modulator 20 is a light transmissive part, configured to receive the light reflected by the reflective display panel 100, and allow the light to transmit through the light transmitting part 20p then to the light beam collector 200.

In one example, the light modulator 20 is made of a glass panel, a central region of the glass panel of a small area is made high reflective, thereby forming the point illumination source part 30p. The remaining region of the glass panel is made highly transmissive, thereby forming the light transmitting part 20p. The remaining region surrounds the central region of the glass panel.

In some embodiments, and referring to FIG. 7 and FIG. 8, light emitted from the light source 10 focused by the optical coupling lens onto the point illumination source part 30p of the light modulator 20, the point illumination source part 30p reflects a diffused light to illuminate on the reflective display panel 100. Optionally, the light from the point illumination source part 30p is a polarized light, a polarization direction of which is substantially parallel to a polarization direction of the reflective display panel 100.

Referring to FIG. 7, the light separating surface 211 and the main surface S of the reflective display panel 100 form an angle α. Optionally, the angle α is less than 90 degrees. Optionally, a central normal line of the reflective display panel 100 intersects the light separating surface 211 at a central point of the point illumination source part 30p. The light from the optical coupling lens is focused on the point, illumination source part 30p, and is reflected by the point illumination source part 30p as a diffused light transmitted to the reflective display panel 100, By adjusting a distance between the light separating surface 211 and the reflective display panel 100 and the angle α between the light separating surface 211 and the main surface S of the reflective display panel 100, it can be ensured that light reflected by the point illumination source part 30p illuminates on a substantially entire surface of the reflective display panel 100. For example, the light reflected by the point illumination source part 30p forms an illumination zone illuminating the surface of the reflective display panel 100. The light from the illumination zone is reflected by the reflective display panel 100, in a form of another illumination zone having a greater area. The light reflected by the reflective display panel 100 reaches the light separating surface 211 in a region corresponding to the light transmitting part 20p of the light modulator 20, and transmits through the light separating surface 211 to the light beam collector 200.

Referring to FIG. 7 and FIG. 8, the light beam collector 200 in some embodiments is disposed facing the reflective display panel 100, e.g., on a side of the light modulator 20 distal to the reflective display panel 100. The light modulator 20 is between the reflective display panel 100 and the light beam collector 200. The light reflected by the reflective display panel 100 transmits through the light modulator 20 and reaches the light beam collector 200.

The point illumination source part 30p has a relatively very small area as compared to an area of the light transmitting part 20p. Essentially all light transmitted through the light transmitting part 20p of the light modulator 20 can be received by the light beam collector 200, resulting in a very high light utilization rate.

Referring to FIG. 8, the light modulator 20 in some embodiments is adhered to the reflective display panel 100 (e.g., to a main surface of the reflective display panel 100). The light separating surface 211 is a surface of the light modulator 20 facing away the reflective display panel 100. In some embodiments, the light modulating device further includes an optical fiber securer 40 attached to a surface of the light modulator 20, e.g., attached to the light separating surface 211 of the light modulator 20. The optical fiber securer 40 is configured to secure an optical fiber.

Optionally, the highly reflective surface of the point illumination source part 30p includes a plurality of reflective prisms. The light focused by the optical coupling lens is focused on the plurality of reflective prisms in the point illumination source part 30p, and is reflected by the plurality of reflective prisms to the reflective display panel 100, thereby forming the point illumination source 30.

Optionally, the point illumination source part 30p has a relatively small area. Optionally, the point illumination source part 30p has a diameter or width equal to or less than 50 µm, e.g., equal to or less than 40 µm, equal to or less than 30 µm, equal to or less than 20 µm, and equal to or less than 10 µm.

Optionally, a central point of a projection of the point illumination source part 30p on the reflective display panel 100 substantially overlaps with a central point of the reflective display panel 100, By having this design, the reflective display panel 100 is configured to receive the light from the point illumination source 30 in a symmetrical manner. Optionally, an optical axis of the optical coupling lens and a central normal line of the reflective display panel 100 are symmetrical with respect to a line normal to the light separating surface 211 and intersecting a central point of the point illumination source part 30p.

In some embodiments, the light transmitting part 20p of the light modulator 20 is a light transmissive part, configured to receive the light reflected by the reflective display panel 100, and allow the light to transmit through the light transmitting part 20p then to the light beam collector 200.

In one example, the light modulating device includes a prism assembly including a plurality of prisms in a central region of the prism assembly thereby forming a highly reflective surface of the point illumination source part, and an adapting lens 50 having a surface compatibly connected to the light separating surface 211 of the light modulator 20. Optionally, the surface of the adapting lens 50 is adhered to the light separating surface 211 of the light modulator 20, facilitating light transmitting inside of the light modulator 20 through the light separating surface 211 of the light modulator 20.

In some embodiments, and referring to FIG. 7 and FIG. 8, light emitted from the light source 10 focused by the optical coupling lens onto the point illumination source part 30p of the light modulator 20, the point illumination source part 30p reflects a diffused light to illuminate on the reflective display panel 100. Optionally, the light from the point illumination source part 30p is a polarized light, a polarization direction of which is substantially parallel to a polarization direction of the reflective display panel 100.

Referring to FIG. 8, the light separating surface 211 and the main surface S of the reflective display panel 100 form an angle α. Optionally, the angle α is less than 90 degrees. Optionally, a central normal line of the reflective display panel 100 intersects the light separating surface 211 at a central point of the point illumination source part 30p. The light from the optical coupling lens is focused on the point illumination source part 30p, and is reflected by the point illumination source part 30p as a diffused light transmitted to the reflective display panel 100. The light is then reflected by the reflective display panel 100, and transmits through the inside of the light modulator 20, until it reaches the light separating surface 211 in a region corresponding to the light transmitting part 20p. The light then transmits through the light separating surface 211, enters into the adapting lens 50. The light transmits through the adapting lens 50, and reaches the light beam collector 200.

Referring to FIG. 8, the light beam collector 200 in some embodiments is disposed facing the reflective display panel 100, e.g., on a side of the light modulator 20 distal to the reflective display panel 100. The light modulator 20 is between the reflective display panel 100 and the light beam collector 200. The light reflected by the reflective display panel 100 transmits through the light modulator 20 and reaches the light beam collector 200.

The point illumination source part 30p has a relatively very small area as compared to an area of the light transmitting part 20p. Essentially all light transmitted through the light transmitting part 20p of the light modulator 20 can be received by the light beam collector 200, resulting in a very high light utilization rate.

In FIG. 8, the reflective display panel 100 is adhered to the light modulator 20, resulting in a simplified and highly compact structure.

Because the point illumination source part 30p has a relatively very small area as compared to an area of the light transmitting part 20p, the missing optical information corresponding to the point illumination source part 30 is minimal, resulting very little effects on image display.

Referring to FIG. 5 to FIG. 8, the display apparatus in some embodiments further includes light absorption screen 60 surrounding a periphery of the reflective display panel 100, Optionally, the reflective display panel 100 is a liquid crystal on silicon display panel. The light absorption screen 60 can absorb any interfering light, preventing interference on the reflective display panel 100.

In another aspect, the present disclosure provides a display apparatus. In some embodiments, the display apparatus includes alight modulating device as described herein and a reflective display panel. The reflective display panel configured to receive light transmitted from the point illumination source, and configured to reflect light to the light transmitting part. Optionally, the reflective display panel is a liquid crystal on silicon display panel, in some embodiments, the display apparatus is a near eye display apparatus.

In another aspect, the present disclosure provides a method of image display. In some embodiments, the method of image display include forming a point illumination source in a point illumination source part of a light modulator, the point illumination source configured to provide point illumination; transmitting light from the point illumination source to a reflective display panel; reflecting light from the point illumination source by the reflective display panel to a light transmitting part of the light modulator, the point illumination source part being substantially surrounded by the light transmitting part; and transmitting light reflected by the reflective display panel to a light beam collector by the light transmitting pan. Optionally, the method further includes providing light from a light source; and transmitting light emitted from the light source to the point illumination source part to form the point illumination source.

In some embodiments, the step of forming the point illumination source in the point illumination source part of a light modulator includes transmitting light emitted from the light source through a light guide to the point illumination source part; and allowing the light transmitted by the light guide to transmit through the point illumination source part, thereby forming the point illumination source for providing light to the reflective display panel. Optionally, the step of transmitting the light reflected by the reflective display panel to the light beam collector by the light transmitting part includes reflecting the light reflected by the reflective display panel and received by the light transmitting part to the light beam collector.

In some embodiments, the step of forming the point illumination source in the point illumination source part of a light modulator includes transmitting light emitted from the light source through a light guide to the point illumination source part; and reflecting the light transmitted by the light guide to the reflective display panel, thereby forming the point illumination source for providing light to the reflective display panel. Optionally, the step of transmitting the light reflected by the reflective display panel to the light beam collector by the light transmitting part includes allow the light reflected by the reflective display panel and received by the light transmitting part to transmit through the light transmitting part to the light beam collector.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light modulating device for a display apparatus, comprising:
   a light source;
   a light modulator comprising a point illumination source part and a light transmitting part, the point illumination source part being substantially surrounded by the light transmitting part; and
   a light guide configured to transmit the light emitted from the light source to the point illumination source part, thereby forming the point illumination source in the point illumination source part;
   wherein the point illumination source part is configured to receive polarized light from the light source to form a point illumination source, the point illumination source transmitting the polarized light from the light source to a reflective display panel;
   the light transmitting part is configured to receive light reflected by the reflective display panel and configured to transmit light reflected by the reflective display panel to a light beam collector;
   the point illumination source part is configured to allow light transmitted by the light guide to transmit through the point illumination source part, thereby forming the point illumination source for providing light to the reflective display panel; and
   the light transmitting part is configured to receive light reflected by the reflective display panel and configured to reflect the light reflected by the reflective display panel to the light beam collector.

2. The light modulating device of claim 1, wherein the light guide comprises an optical fiber configured to transmit the light emitted from the light source to the point illumination source part; and
   the point illumination source part is configured to allow light transmitted by the optical fiber to transmit through the point illumination source part, thereby forming the point illumination source for providing the light to the reflective display panel.

3. The light modulating device of claim 2, wherein the light modulator comprises a via extending at least partially through the point illumination source part; and
   a first terminal of the optical fiber is secured in the via.

4. The light modulating device of claim 3, wherein the via has a diameter equal to or less than 150 μm.

5. The light modulating device of claim 2, further comprising an optical fiber securer attached to a surface of the light modulator;
   wherein a first terminal of the optical fiber is in a via extending at least partially through the optical fiber securer.

6. The light modulating device of claim 1, wherein the light transmitting part comprises one or a combinations of a reflective layer and a plurality of reflective prisms, configured to reflect the light reflected by the reflective display panel to the light beam collector.

7. The light modulating device of claim 1, wherein the point illumination source is configured to transmit the polarized light from the light source to form an illumination zone to illuminate the reflective display panel; and
   a central axis of the illumination zone approximately intersects with a central point of the reflective display panel.

8. A display apparatus, comprising the light modulating device of claim 1; and
   the reflective display panel configured to receive light transmitted from the point illumination source, and configured to reflect light to the light transmitting part.

9. The display apparatus of claim 8, wherein the reflective display panel is a liquid crystal on silicon display panel.

10. The display apparatus of claim 8, wherein the display apparatus is a near eye display apparatus.

11. A light modulating device for a display apparatus, comprising:
    a light source;
    a light modulator comprising a point illumination source part and a light transmitting part, the point illumination source part being substantially surrounded by the light transmitting part; and
    a light guide configured to transmit the light emitted from the light source to the point illumination source part, thereby forming the point illumination source in the point illumination source part;
    wherein the point illumination source part is configured to receive polarized light from the light source to form a point illumination source, the point illumination source transmitting the polarized light from the light source to a reflective display panel;
    the light transmitting part is configured to receive light reflected by the reflective display panel and configured to transmit light reflected by the reflective display panel to a light beam collector;
    the point illumination source part is configured to reflect light transmitted by the light guide to the reflective display panel, thereby forming the point illumination source for providing light to the reflective display panel; and
    the light transmitting part is configured to receive light reflected by the reflective display panel and configured to allow the light reflected by the reflective display panel to transmit through the light transmitting part to the light beam collector.

12. The light modulating device of claim 11, wherein the light guide comprises an optical coupling lens configured to focus the light emitted from the light source onto the point illumination source part; and
    the point illumination source part is configured to reflect light focused by the optical coupling lens, thereby forming the point illumination source for providing the light to the reflective display panel.

13. The light modulating device of claim 11, wherein the point illumination source part comprises one or a combinations of a reflective layer and a plurality of reflective prisms, configured to reflect the light transmitted by the light guide.

14. A light modulating device for a display apparatus, comprising:
    a light source; and
    a light modulator comprising a point illumination source part and a light transmitting part, the point illumination source part being substantially surrounded by the light transmitting part;
    wherein the point illumination source part is configured to receive polarized light from the light source to form a point illumination source, the point illumination source transmitting the polarized light from the light source to a reflective display panel; and the light transmitting part is configured to receive light reflected by the reflective display panel and configured to transmit light reflected by the reflective display panel to a light beam collector;

wherein the light modulator has a light separating surface, from which the light transmitting part transmits the light reflected by the reflective display panel to the light beam collector and from which the point illumination source part transmits the polarized light from the light source to the reflective display panel; and the light separating surface and a main surface of the reflective display panel form an angle less than 90 degrees.

15. The light modulating device of claim 14, wherein the light modular is spaced apart from the reflective display panel; and the light separating surface is a surface of the light modulator facing the reflective display panel.

16. The light modulating device of claim 14, wherein the light modular is adhered to the reflective display panel; and the light separating surface is a surface of the light modulator facing away the reflective display panel.

* * * * *